July 28, 1959 W. J. FINN 2,897,019
RAILROAD JOURNAL BEARING
Filed Dec. 21, 1956 2 Sheets-Sheet 1
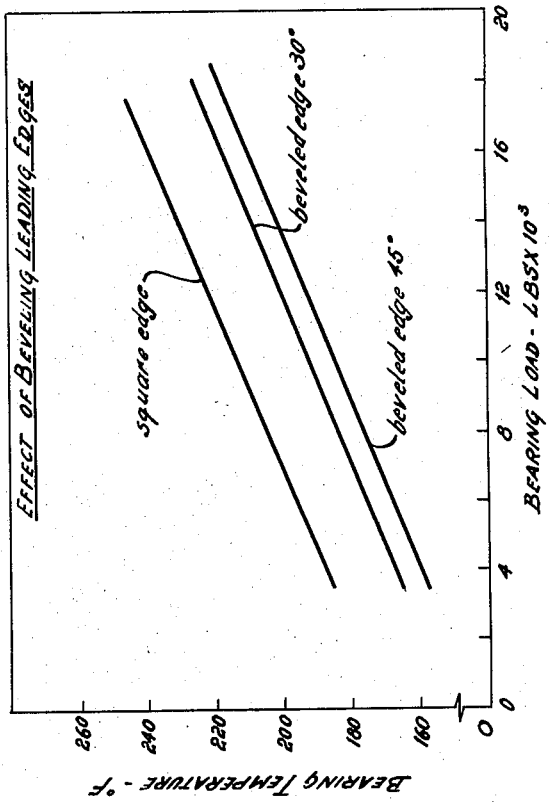
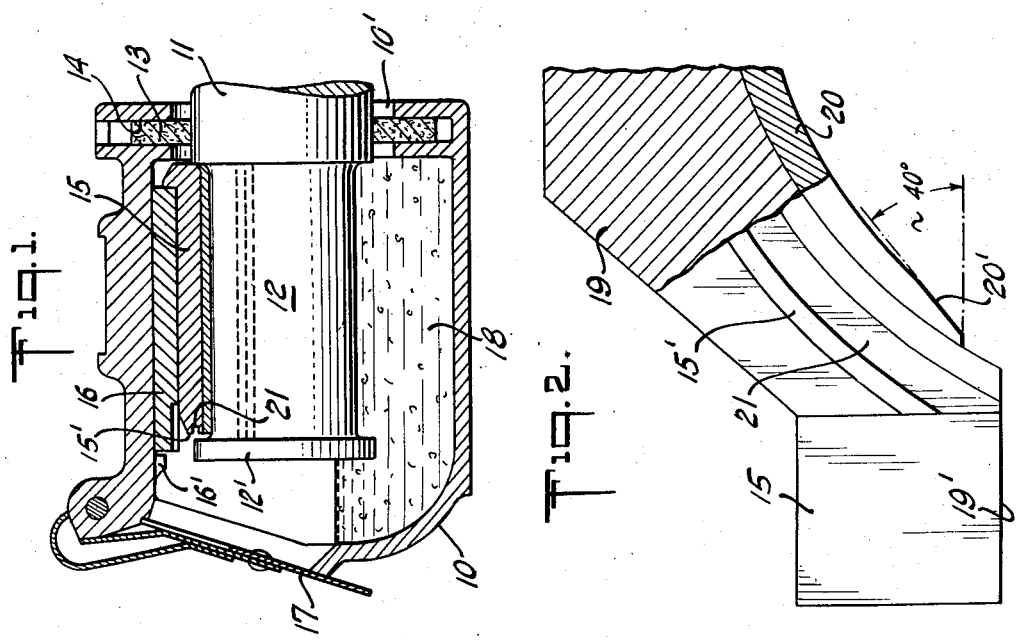

United States Patent Office 2,897,019
Patented July 28, 1959

2,897,019

RAILROAD JOURNAL BEARING

William J. Finn, Pawling, N.Y., assignor to Texaco Inc., a corporation of Delaware Application December 21, 1956, Serial No. 629,915

2 Claims. (Cl. 308—79.1)

The present invention relates generally to bearings for heavy duty journals, and in particular to improvements in the grease lubrication of plain railroad car journal bearings.

With the prior art standard bearing assemblies of the Association of American Railroads, a mass of waste, e.g. cotton fibers, saturated with a lubricating oil, is disposed in the lower part of the journal box carried by the railroad car truck. This saturated mass of waste bears against the exposed (i.e. lower) part of the journal and leaves a film of lubricant on the surface of the rotating journal which it contacts. Even under the most favorable conditions, the flow of lubricant is slow, being dependent on the viscosity of the lubricant as determined by the ambient temperatures. Furthermore, there is a tendency for some of the waste fibers to be carried between the contacting surfaces of the bearing and the rotating journal, thus increasing friction by such waste grabbing and so endangering the life of the bearing. Dependent upon conditions, with an insufficient supply of lubricant between the contacting surfaces, the resultant increased bearing temperatures may be sufficient to ignite the lubricant saturated waste, resulting in a "hot box," and probably causing a fire with destruction of valuable equipment.

The problem arising from the increasing number of "hot boxes" on railroad car journal bearings, caused by excessive development of heat resulting from insufficient and/or improper lubrication, has become of primary concern to the industry. In one recent year, almost one quarter million freight cars were set out between terminals because of defective journal bearings. It is believed that the principal cause leading to this condition is the increased speed and loading of the cars. The extending use of diesel locomotives has been effective in increasing car speeds, while the continuously enlarging traffic has had a tendency to build up car loading closer to the maximum capacity.

Experience in heavy duty applications has shown that plain or sleeve type bearings, with the proper lubrication and bearing materials, are more satisfactory under high loading operating conditions than any other type of bearing. Accordingly, an object of the present invention is to provide an improved bearing of this type for use with heavy duty journals.

Another object of invention is to provide a novel plain bearing structure leading to improved journal lubrication.

Still another object of invention is to provide an improved plain bearing construction for use with railroad car journals which are lubricated by grease.

These and other objects and advantages of the invention will become apparent from the following description when read in conjunction with the accompanying drawings wherein:

Fig. 1 is the longitudinal sectional view through the journal box of a conventional railroad car journal;

Fig. 2 is a partial transverse and enlarged sectional view of the bearing disclosed in Fig. 1, showing one of the edges of the bearing;

Fig. 3 is a graph showing the effect of beveling the leading edges of a bearing with respect to bearing temperatures and loadings;

Figure 4:
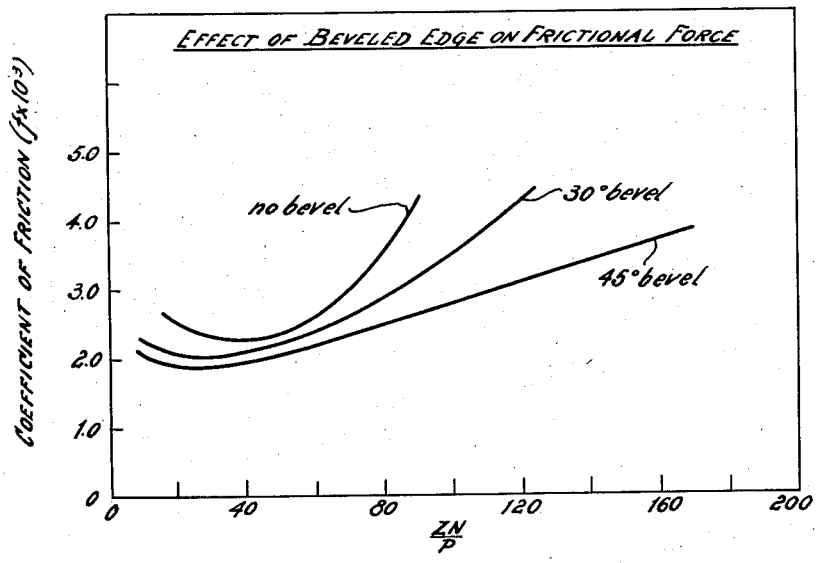
Fig. 4 is a graph showing the effect of a beveled edge on frictional force.

In accordance with my invention, improved railroad journal lubrication is achieved by the provision of preformed liner edges of the bearing together with a lubricant reservoir on the outer face of the bearing.

Referring to Fig. 1, there is disclosed a journal box 10, of standard construction, for use with railroad car trucks and defining a lubricant reservoir. The axle 11 supporting a car wheel extends through the journal box opening at 10' and has the journal 12 at the end thereof, with an integral flange or annular collar 12' at the outer edge. The opening 10' through which the end of the axle extends into the journal box is closed by a flexible sealing ring and dust guard 13, formed, for example, from felt, and retained in place in the dust guard slot 14. Bearing 15 rests upon the journal 12 and is locked in place by means of the wedge 16 which contacts the upper wall of the journal box and abuts the lock shoulder 16' projecting therefrom. A hinged closure for the inspection and filler opening of the journal box is disclosed at 17, for retaining the grease 18 in the journal box. The usual operating level for the grease is such as to cause the journal to run submerged from about one-third to almost its centerline in grease.

Referring now to Figs. 1 and 2, journal bearing 15 is of standard AAR construction and dimensions and comprises a backing 19 of bronze and a bearing surface or liner 20, preferably of babbitt. This bearing surface has chamfered or beveled edges, one of which, either leading or trailing, is indicated at 20', in Fig. 2. The bevel cut is shown as at an angle of approximately 40° with respect to the edge of the babbitt bearing surface 20 and so to the base 19' of the bronze backing, the edge and base being parallel to each other. This angle may vary from 30–90° with the usual range from 30–45°, and extends from the edge of the liner to a point approximately ¼" measured vertically, with relation to the base 19', from the starting edge of the bearing surface. In this manner, the abrupt change in surface contact which exists in the prior art bearings, where the bearing surface or liner forms a substantially close contact with the journal bearing from edge to edge of the liner, is avoided. The chamfer on both edges of the bearing surface extends the full length of the liner and leads to a more uniform and improved lubrication of the journal bearings, as disclosed effectively in Fig. 3, where the increase in bearing temperature is plotted against the bearing load. As shown, the two lower plots, for beveled edges, have lower bearing temperatures, and experiments have shown that in the case of the upper plot, bearing failure occurs in the form of a "hot box."

Fig. 4 is a parallel showing of a chart disclosing lower frictional forces with respect to load carrying capacity, as exemplified by plotting the coefficient of friction against the minimum bearing characteristic number ($ZN/P$). This number is the product of the oil viscosity in poises (Z) multiplied by the shaft speed in r.p.m. (N) divided by the bearing pressure, pounds per square inch (P), at the time of seizure. In the determination of this number, the loading pressure (P) is increased, or either the speed (N) or oil viscosity (Z) is decreased until a point is reached, at which there is enough metal to metal contact to cause the journal and bearing to seize. The value of $ZN/P$ at this point is termed the minimum $ZN/P$ for the bearing in question. The curves in this figure give clear evidence that the beveling of the (leading) edge of a bearing results in a decrease in the frictional force exerted on the journal bearing.

Figure 5:
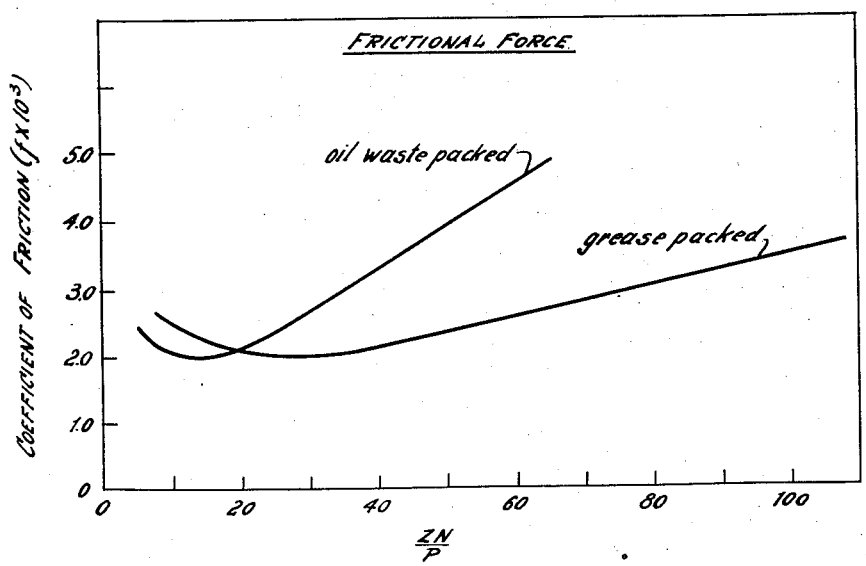
Fig. 5 is a graph comparing frictional forces for saturated waste and grease lubricated journal bearings.

Fig. 5 is a graph indicating lower frictional forces when using grease lubrication for a bearing with a beveled leading edge vis-a-vis prior art oil waste packed lubrication as exemplified by plotting the coefficient of friction against the previously discussed minimum bearing characteristic number $ZN/P$.

While chamfering the edges of the liner of the bearing has reduced the frictional forces encountered, an additional feature has been found helpful. This is the provision of a groove 21 on the bearing outer face 15' of the backing 19, adjacent the flange 12' of the journal 12. Under service conditions, the journal and bearing have lateral motion relative to each other produced on curves and by car sway so that inevitably there is contact and friction when the bearing outer face 15' of the backing moves against the flange 12', which serves as a thrust block. To reduce the resultant frictional forces, the groove 21 has been provided to serve as a grease reservoir, so that when contact is made, there is a supply of lubricant along the surface of contact. With the standard AAR five and one-half by ten inch bronze-backed babbitted journal bearing, this groove is three sixteenths inches square and is milled in the bronze backing to conform to the curve of the babbitt inlay and at least one-eighth inch away from the inlay so as not to interfere with the bond between the bronze and babbitt. This groove not only provides a reservoir for lubricant but also aids in the circulation of grease to the load zone.

Thus, there has been shown and described an improved bearing structure with chamfered liner edges for use with heavy duty applications where more efficient lubrication of the bearing load zone is insured by permitting the grease to more easily penetrate thereto and overheating of the bearing is virtually eliminated, as is the presence of oil soaked waste for lubrication of the journal, together with the provision of a grease reservoir for providing lubrication when the journal flange is contacted because of lateral motion.

Obviously, many modifications and variations of the invention, as hereinbefore set forth, may be made without departing from the spirit and scope thereof, and therefore only such limitations should be imposed as are indicated in the appended claims.

I claim:

1. In combination with a journal box and an axle having a journal end rotatable therein, said journal end having an upstanding flange at its outer edge, a load supporting bearing of standard AAR dimensions mounted in said journal box in contact with said journal end of said axle within said flange, said bearing having a liner with longitudinal edges chamfered their entire lengths, the chamfered edges being beveled at an angle varying from 30° to 45° with respect to the base of said bearing, each beveled surface at said chamfered edges extending from each respective edge of said liner to the intersection with a plane passing through each respective edge parallel to said base of said bearing and spaced about ¼" therefrom.

2. In the combination as defined in claim 1, said chamfered edges having a bevel of approximately 40°, and said bearing having a groove on the outer face thereof adapted to abut said upstanding flange as a result of lateral motion, said groove serving as a lubricant reservoir between respective contacting surfaces and aiding in the circulation of lubricant to the load supporting zone of said bearing.

References Cited in the file of this patent

UNITED STATES PATENTS

| | | |
|---|---|---|
| 1,070,257 | Hinkley et al. | Aug. 12, 1913 |
| 1,964,688 | Pearce | June 26, 1934 |
| 2,592,294 | Korn | Apr. 8, 1952 |

FOREIGN PATENTS

| | | |
|---|---|---|
| 358,616 | Germany | Sept. 12, 1922 |
| 473,085 | Germany | Mar. 9, 1929 |